(12) United States Patent
Jones

(10) Patent No.: US 7,942,046 B2
(45) Date of Patent: May 17, 2011

(54) TESTING STRUT ASSEMBLY

(75) Inventor: Martin Edward Jones, Bristol (GB)

(73) Assignee: Airbus Operations Limited, Bristol (GB)

( * ) Notice: Subject to any disclaimer, the term of this patent is extended or adjusted under 35 U.S.C. 154(b) by 120 days.

(21) Appl. No.: 12/279,852

(22) PCT Filed: Mar. 15, 2007

(86) PCT No.: PCT/GB2007/000918
§ 371 (c)(1),
(2), (4) Date: Aug. 19, 2008

(87) PCT Pub. No.: WO2007/104995
PCT Pub. Date: Sep. 20, 2007

(65) Prior Publication Data
US 2009/0056431 A1    Mar. 5, 2009

(30) Foreign Application Priority Data
Mar. 16, 2006 (GB) .................................. 0605345.8

(51) Int. Cl.
*G01M 15/00* (2006.01)
(52) U.S. Cl. .................................................. 73/118.03
(58) Field of Classification Search ............... 73/118.03, 73/11.07–11.09, 116.07, 118.01
See application file for complete search history.

(56) References Cited

U.S. PATENT DOCUMENTS

| | | | |
|---|---|---|---|
| 3,828,614 A | | 8/1974 | Borg |
| 4,672,844 A | | 6/1987 | Meyer |
| 4,843,873 A | * | 7/1989 | Harald et al. .................... 73/147 |
| 4,862,738 A | * | 9/1989 | Jankowski ................. 73/115.07 |
| 4,889,202 A | * | 12/1989 | Bron .............................. 177/134 |
| 4,953,391 A | | 9/1990 | Schober et al. |
| 5,048,342 A | * | 9/1991 | Morelli ........................... 73/669 |

(Continued)

FOREIGN PATENT DOCUMENTS
EP    0094570 A2    11/1983
(Continued)

OTHER PUBLICATIONS
UK Search Report for GB0605345.8 dated Aug. 11, 2006.
(Continued)

*Primary Examiner* — Freddie Kirkland, III
(74) *Attorney, Agent, or Firm* — Lowe, Hauptman, Ham & Berner, LLP

(57) ABSTRACT

A method of testing a steerable wheel assembly incorporating a shock absorber strut, comprising providing a combined linear and rotary actuator, engaging a lower end of the assembly with the actuator so that the line of linear action of the actuator is aligned with the line of compression of the strut, operating the actuator to compress the strut, and operating the actuator in a rotary sense to apply a steering torque to the assembly. A linear actuator is engageable with the assembly via a load coupling to load the strut. The load coupling comprising a first part on the actuator adapted to engage a second part on the assembly, the two parts being adapted to provide a self-aligning action as the actuator engages the assembly. Preferably, one of the two parts comprises a tapered recess formation, and the other two parts comprises a tapered projecting formation engageable in the tapered recess formation. The actuator is preferably controlled by feedback control loops, one incorporating a load sensor, another a torque sensor, which may be combined in a sensor cell located between the actuator and the load coupling.

29 Claims, 4 Drawing Sheets

U.S. PATENT DOCUMENTS

| | | | | |
|---|---|---|---|---|
| 5,072,611 | A * | 12/1991 | Budd et al. | 73/115.07 |
| 5,315,882 | A * | 5/1994 | Meyer et al. | 73/862.44 |
| 5,942,673 | A * | 8/1999 | Horiuchi et al. | 73/11.04 |
| 6,273,613 | B1 * | 8/2001 | O'Brien et al. | 384/448 |
| 6,575,037 | B2 * | 6/2003 | Momoi et al. | 73/633 |
| 6,638,071 | B2 * | 10/2003 | Stockman | 434/35 |
| 7,054,727 | B2 * | 5/2006 | Kemp et al. | 701/29 |
| 7,058,488 | B2 * | 6/2006 | Kemp et al. | 701/33 |
| 7,146,859 | B2 * | 12/2006 | Dittmann et al. | 73/669 |
| 7,401,520 | B2 * | 7/2008 | Parison | 73/669 |
| 7,552,629 | B2 * | 6/2009 | Regis et al. | 73/146 |
| 7,677,096 | B2 * | 3/2010 | Robinson et al. | 73/170.02 |
| 7,690,264 | B2 * | 4/2010 | Robinson et al. | 73/812 |
| 2007/0257150 | A1 * | 11/2007 | Robinson et al. | 244/103 R |

FOREIGN PATENT DOCUMENTS

| | | |
|---|---|---|
| EP | 0283657 A2 | 9/1988 |
| EP | 0 362 658 A1 | 4/1990 |
| GB | 2071267 A | 9/1981 |
| JP | 4106452 | 4/1992 |
| JP | 2005338026 | 12/2005 |
| SU | 913070 A1 | 3/1982 |
| SU | 1027567 | 7/1983 |
| SU | 1107026 | 8/1984 |
| WO | 93/19352 A1 | 9/1993 |

OTHER PUBLICATIONS

International Search Report and Written Opinion for PCT/GB2007/000918 dated Jun. 29, 2007.

* cited by examiner

TESTING STRUT ASSEMBLY

RELATED APPLICATIONS

The present application is based on International Application Number PCT/GB2007/000918 filed Mar. 15, 2007, and claims priority from British Application Number 0605345.8 filed Mar. 16, 2006, the disclosures of which are hereby incorporated by reference herein in their entirety.

TECHNICAL FIELD

This invention relates to testing of an assembly incorporating a shock absorber strut, especially a steerable wheel assembly incorporating a shock absorber strut.

BACKGROUND ART

The nose wheel of an aircraft landing gear assembly is mounted at the end of a shock absorber strut and is steerable when the aircraft is on the ground. A self-centering mechanism is provided which operates to hold the wheel in the straight-ahead condition when the strut is in the extended unloaded condition, particularly during take-off and landing, and which operates to release the wheel for steering when the strut is retracted/loaded with the aircraft on the ground.

Nose wheel landing gear assemblies have to be tested during development so as to ensure that they will withstand the torques and loads which they experience in operation, and therefore a test rig has to be set up to simulate the steering torques involved. A torque actuator is provided which is connected via a torque cell to a lower portion of the landing gear assembly so as to apply a steering torque to the assembly. However, before the steering torque can be applied to the assembly, the shock absorber strut needs to be retracted so as to release the wheel centering mechanism to allow steering movements. This is achieved by depressurizing the strut and lifting the lower end of the assembly using winches. The torque actuator is then installed and connected via the torque cell to the lower end of the strut before the strut is repressurised so that it is then in the operational loaded state. The torque actuator is then able to apply a torque to the assembly at the required torque levels for the purposes of testing.

An object of the invention is to provide an improved method and apparatus for testing an aircraft nose wheel landing gear.

DISCLOSURE OF THE INVENTION

According to one aspect, the invention consists in a method of testing a steerable wheel assembly of an aircraft, incorporating a shock absorber strut, comprising providing an actuator, engaging a lower end of the assembly with the actuator so that the line of linear action of the actuator is aligned to load the strut, and operating the actuator to load the strut, characterised in that the actuator is a combined linear and rotary actuator and engages the assembly via a load coupling comprising respective interlocking formations associated with the actuator and assembly to transfer both a linear and rotary force from the actuator to the assembly, the assembly being operated in the linear mode to engage the interlocking formations and compress the strut, and being operated in the rotary mode to apply a torque to the assembly to simulate in use operating conditions of the wheel assembly in respect of steering torque.

According to a second aspect, the invention consists in a test system for testing a steerable wheel assembly of an aircraft incorporating a shock absorber strut, comprising an actuator engageable with a lower end of the assembly so that the line of linear action of the actuator is aligned with the line of loading of the strut characterised in that the actuator is a combined linear and rotary actuator and a load coupling is provided between the actuator and the assembly comprising respective interlocking formations associated with the actuator and assembly to transfer both a linear and rotary force from the actuator to the assembly, linear operation of the actuator serving to engage the interlocking formations and compress the strut and rotary operation of the actuator serving to apply a torque to the assembly to simulate in use operating conditions of the wheel assembly in respect of steering torque.

According to a third aspect, the invention consists in apparatus for testing an assembly incorporating a shock absorber strut, comprising an actuator engageable with the assembly via a load coupling to load the strut, characterised in that the actuator is a combined linear and rotary actuator and the load coupling comprises a first part on the actuator adapted to engage a second part on the assembly, the two parts being adapted to interlock and provide a self-aligning action as the actuator engages the assembly in the linear mode. Preferably, one of the two interlocking parts comprises a tapered recess formation, and the other of the two parts comprises a tapered projecting formation engageable in the tapered recess formation. This arrangement ensures that the axial load produced by the linear action of the actuator serves to angularly align the actuator with the assembly being tested via the interaction of the two parts of the load coupling. The second part of the load coupling on the assembly may be a permanent fixture at the lower end of the assembly or may be specially attached to the lower end of the assembly for testing purposes. The second part of the load coupling preferably comprises the tapered recess formation.

The actuator is preferably controlled by feedback control loops. A load sensor generating a feedback load signal senses the linear vertical load applied to the steerable wheel assembly, and a torque sensor generating a feedback torque signal senses the torque applied to the assembly during steering. The load and torque sensors are preferably combined in a sensor cell located between the actuator and the load coupling. Linear and angular position sensors may also be provided in respective linear and angular position feedback control loops.

If the assembly incorporates a wheel centering mechanism, release of the mechanism for steering simulation tests can be sensed either by a load or a linear position sensor in a feedback control loop.

The linear loading action of the actuator simulates vertical loading conditions when the nose wheel is on the ground, variations in loading being controlled by position or load feedback control. The rotary action of the actuator serves to apply torque to the wheel assembly to simulate steering torque conditions, and variations in torque is controlled by position or torque feedback control. In-flight conditions are simulated by positioning the wheel in the straight-ahead condition and retracting the actuator to reduce the loading and to disengage the load coupling. The nose wheel landing gear can then be moved to simulate stowing of the wheel assembly in flight. Therefore, the test system is able to simulate all operating conditions of the wheel assembly including those for taxiing on a runway, take-off, or landing. Real aircraft monitoring data may be used to drive the actuator, or a computer generated simulation may be used for testing. In addition, the test system of the third aspect of the invention can be used to test a non-steerable nose wheel to determine whether it can withstand rotary torques.

BRIEF DESCRIPTION OF THE DRAWINGS

The invention will now be described by way of example with reference to the accompanying drawings in which.

BEST MODE FOR CARRYING OUT THE INVENTION

Figure 1:
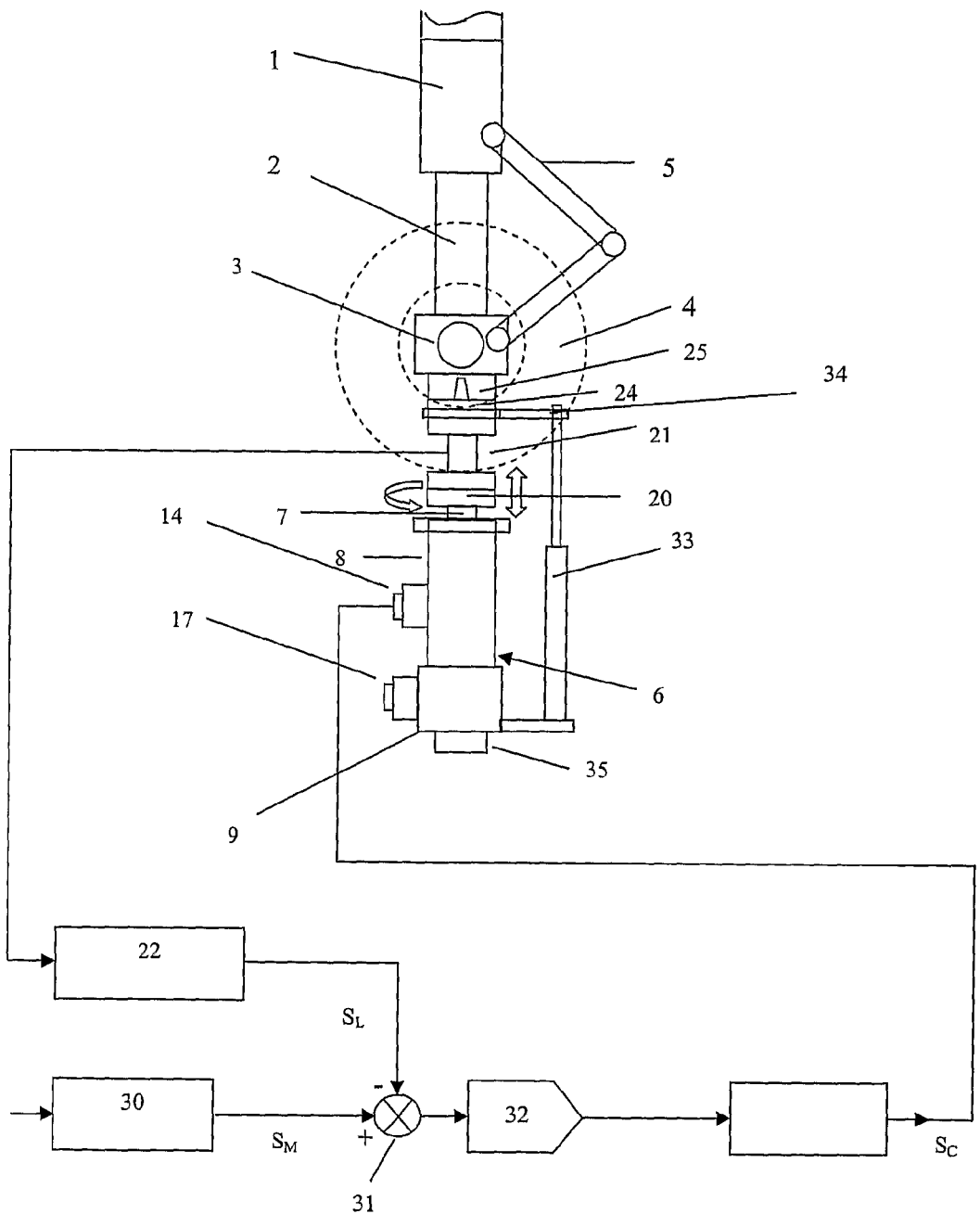
FIG. 1 is a schematic drawing of an aircraft nose wheel landing gear in a test rig according to the invention.
Figure 2:
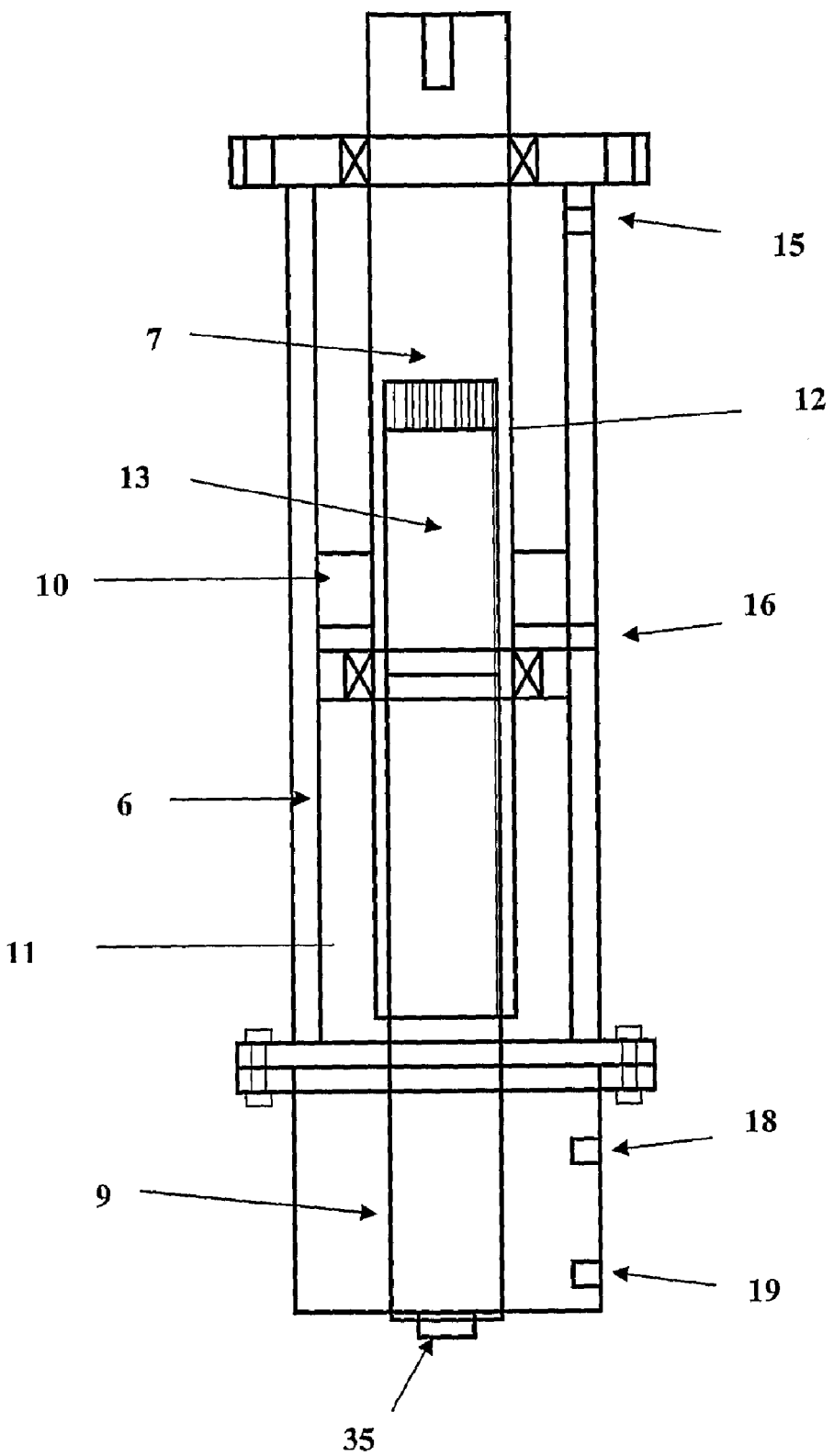
FIG. 2 is a section through the combined linear and rotary actuator of FIG. 1.

Part of the nose wheel landing gear assembly of an aircraft is illustrated in FIG. 1, as installed in a test rig. The assembly comprises a shock absorber strut 1 incorporating an oleo unit 2, which carries an axle mounting 3 for a nose wheel 4 at its lower end. A pair of alignment links 5 are mounted between the outer casing of the strut 1 and the axle mounting 3. A combined linear and rotary actuator 6 is mounted in the rig below the strut 1 with the piston rod 7 of the linear actuator 8 axially aligned vertically with the oleo unit 2 and strut 1. The actuator 6 also incorporates a rotary actuator 9 in the form of a torque motor at its lower end which operates to rotate the piston rod 7. The internal arrangement of the actuator is illustrated in FIG. 2 and shows the piston rod 7 connected to a piston 10 within a cylinder 11, and a splined connection 12 between the lower end of the piston rod 7 and an upwardly projecting drive shaft 13 of the rotary actuator 9. A servo-control valve 14 mounted on the outside of the cylinder 11 controls the flow of hydraulic fluid to the linear actuator 8 via ports 15 and 16; and a servo-control valve 17 mounted on the outside of the rotary actuator 9 controls the flow of hydraulic fluid to the rotary actuator via ports 18 and 19. Respective feedback control loops control each of the servo-control valves 14, 17 as described herein below.

Figure 3:
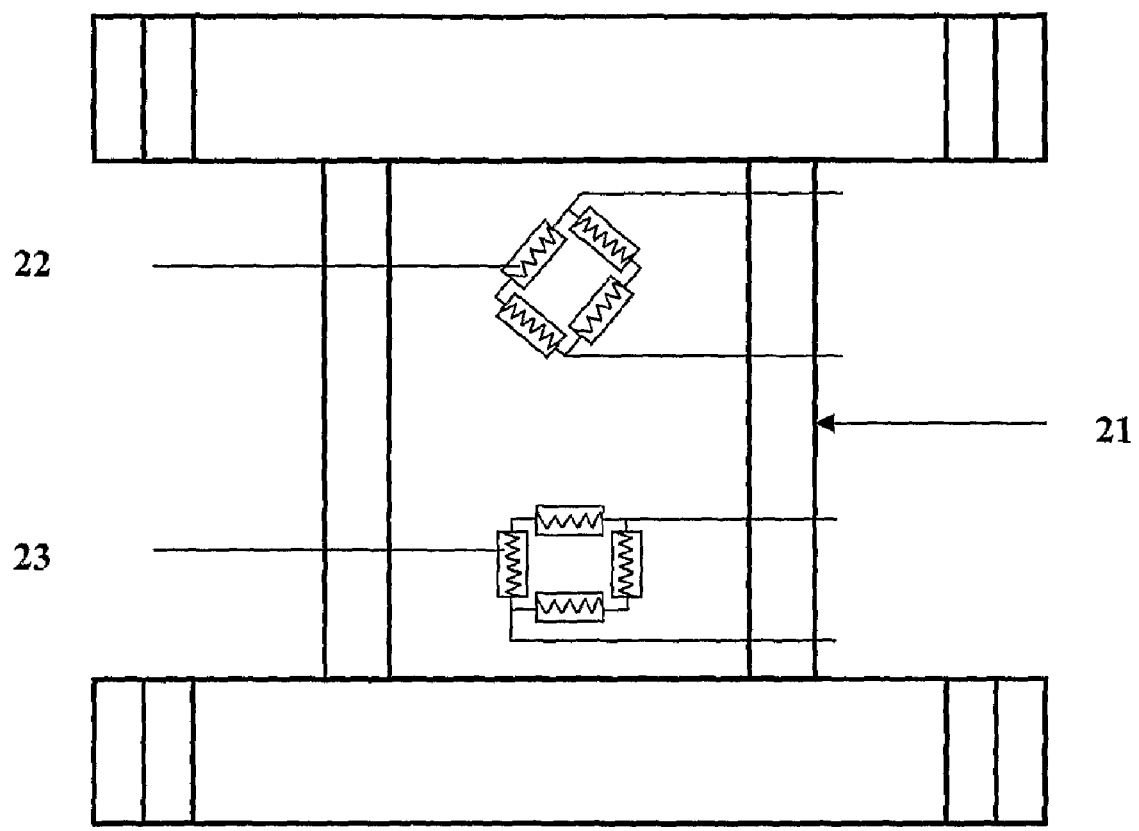
FIG. 3 is a schematic section through the load coupling in FIG. 1.

The upper end of the piston rod 7 carries a mounting flange 20 to which is connected a combined torque and load cell 21 incorporating a load sensor 22 and a torque sensor 23 as shown in FIG. 3. The upper end of the cell 21 is connected to one part 24 of a two part load coupling which interlocks with a second part 15 of the load coupling connected to the underside of the axle mounting block 3. The two parts of the load coupling 24, 25 are shown engaged in FIG. 1, but it will be appreciated that they can be axially separated.

Figure 4:
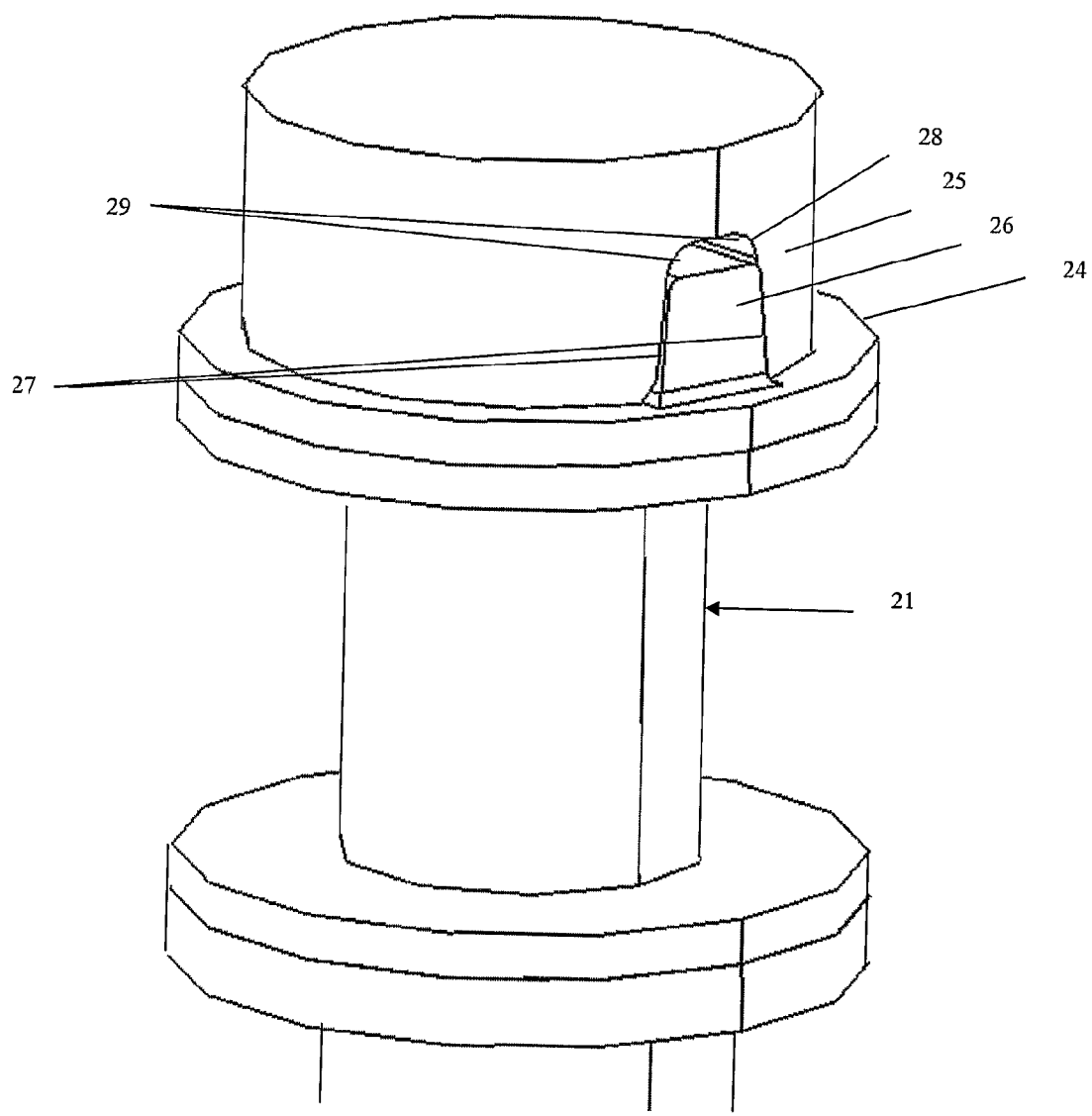
FIG. 4 is a more detailed view of the load coupling in FIG. 1.

As shown in more detail in FIG. 4, the lower part 24 of the load coupling connected to the cell 21 has an upwardly extending projection 26 in the form of a diametrically extending bar with inwardly tapering side walls 27, and the upper part 25 of the load coupling has a recess 28 in the form of a diametrically extending slot with downwardly and outwardly extending side walls 29 that match the shape of the walls 27 of the lower part 24. The respective walls 27, 29 of the first and second parts 24, 25 of the load coupling come into engagement and produce a self-aligning action when the linear actuator 8 operates to engage and interlock the two parts of the assembly. The axial load and rotary torque applied to the assembly are transferred through these engaging walls 27, 29.

The load sensor 22 and torque sensor 23 in the cell 21 are connected in respective feedback control loops including the servo-control valves 14 and 17. FIG. 1 shows the load feedback control loop comprising the load sensor 22 generating a sensed load signal which is combined with a load command signal $S_M$ from a command unit 30 in an adder 31 to produce an output signal that is amplified in an amplifier 32 and applied as a feedback load control signal $S_C$ to the servo-control valve 14. The torque feedback control loop is not shown, but would be similar with the torque sensor 23 instead of the load sensor 22, a torque command unit instead of the load command unit 30, and the servo-control valve 17 instead of the servo-control valve 14. In use, the linear actuator 8 applies a load to the wheel assembly through the cell 21 and load coupling 24, 25, and the applied load is controlled by the load feedback control signal from the load sensor. Similarly, the rotary actuator 9 applies a rotary torque to the wheel assembly via the cell 21 and load coupling 24, 25, and the torque is controlled by the torque feedback control signal from the torque sensor.

The wheel assembly incorporates a self-centering mechanism (not shown), which may take any known form, for example, self-centering cams, that engage to hold the wheel in the straight-ahead condition when the shock absorber strut 1 and oleo 2 are in the extended state for landing or take-off. However, when the strut 1 and oleo 2 are retracted under load, with the wheel in engagement with the runway, the self-centering mechanism is released to allow the mechanism to be rotated for steering. A position sensor 33 is provided to detect the retracted position of the strut 1 and oleo 2 at which the wheel becomes steerable. The position sensor 33 as shown in FIG. 1 comprises an LVDT device connected between the actuator 6 and an arm 34 extending radially from the lower part 24 of the load coupling which is fixed to it axially but free to rotate relative to said lower part 24. An output signal from the position sensor 33 is supplied to a servo-control loop to control the actuator 6 in moving the wheel assembly axially during testing. The servo-control loop would be similar to the load and torque control loops but with the position sensor 33 and a position command unit.

In a simple arrangement, the actuator 6 is controlled so that the linear actuator 8 operates to lift the axle mount 3 to a position where the wheel-centering mechanism is released, and then the wheel is maintained at this height while the rotary actuator 9 applies a torque to the assembly to simulate steering loads. The linear actuator 8 is then operated to lower the wheel to the wheel locked position corresponding to the take-off condition of the aircraft. It is also possible for the linear actuator 8 to be controlled so as to lift the wheel to the steering position, and then to vary the vertical load applied to the assembly so as to simulate variations in loading whilst taxiing on a runway.

The apparatus also incorporates an angular position sensor 35 in the form of a rotary potentiometer. As shown in FIG. 1, the angular sensor is connected to the lower end of the drive shaft 13 of the torque actuator 9. This generates an angular position signal that is used in a servo-control loop to control the angular position of the wheel under test in accordance with an angular position command signal.

It will be appreciated that the invention facilitates testing of a nose wheel landing gear, both for steering loads and vertical loads without having to reconfigure the test rig for each. Testing is therefore simplified and speeded up. The use of a combined linear and rotary actuator 6, a separable load coupling 24, 25 between the actuator and the wheel assembly, and the combined torque and load cell 21 are each important features of the invention which confer significant benefits in operation.

In an alternative embodiment of the invention, the upper part 25 of the load coupling may be an integral part of the axle mount 3 rather than being a separate part which needs to be attached for testing purposes.

The third aspect of the invention is applicable to testing of any assembly incorporating a shock absorber strut which needs to be retracted/loaded for torque testing. For example, automotive suspension systems.

The invention claimed is:

1. A method of testing a steerable wheel assembly of an aircraft incorporating a shock absorber strut, comprising:
engaging a lower end of the wheel assembly with an actuator via a load coupling so that a line of linear action of the actuator is aligned to load the strut, and
linearly and rotationally loading the strut, wherein linearly and rotationally loading the strut includes:
applying a linear force from the actuator to the wheel assembly to releasably engage interlocking formations and compress the strut, and
applying a steering torque to the wheel assembly, rotating the strut to simulate in use operating conditions of the wheel assembly in respect of steering torque.

2. A method as claimed in claim 1, wherein the actuator operates in a linear mode to load the shock absorber strut to a predetermined release level at which time a wheel centering mechanism, holding the wheel in a straight-ahead condition, is released to allow the wheel to be steered.

3. A method as claimed in claim 1, further comprising self-aligning the load coupling with a linear actuator for applying the linear force.

4. A method as claimed in claim 3, wherein self-aligning the load coupling with the linear actuator includes aligning a tapered recess formation with a tapered projecting formation, the tapered projecting formation engaging the tapered recess formation.

5. A method as claimed in claim 1, further comprising sensing a loading of the strut by the actuator, and generating a load control signal used in a load feedback control loop to control operation of the actuator in loading the strut.

6. A method as claimed in claim 5, wherein the load sensing of the strut includes sensing is sensed by a position or load sensor.

7. A method as claimed in claim 1, further comprising sensing steering torque applied by the actuator to the wheel assembly, and generating a torque control signal used in a torque feedback control loop to control operation of the actuator in applying torque to the wheel assembly.

8. A method as claimed in claim 7 wherein a position or torque sensor senses the steering torque.

9. A method as claimed in claim 1, further comprising sensing a load and torque applied to the strut by a sensor connected between the actuator and the wheel assembly, the sensor generating a load control signal and a torque control signal.

10. A method as claimed in claim 1, further comprising controlling the actuator to simulate in use operating conditions of the wheel assembly in respect of strut loading.

11. A method as claimed in claim 1 for testing a steerable nose wheel of an aircraft.

12. A test system for a steerable wheel assembly of an aircraft incorporating a shock absorber strut, comprising:
an actuator engageable with a lower end of the wheel assembly so that a line of linear action of the actuator is aligned with a line of loading of the strut, wherein the actuator is a combined linear and rotary actuator; and
a load coupling disposed between the actuator and the wheel assembly, the actuator having interlocking formations for transferring both a linear force and a rotary force from the actuator to the wheel assembly,
wherein the actuator has a linear operational mode for engaging the interlocking formations and compressing the strut, and has a rotary operational mode for applying a steering torque to the wheel assembly about the line of linear action.

13. A system as claimed in claim 12 in which the load coupling is releasable and is configured to provide a self-aligning action when the interlocking formations engage when the actuator operates in the linear operational mode.

14. A system as claimed in claim 13 in which the interlocking formations includes a tapered recess formation disposed on one of the wheel assembly or the actuator, and a tapered projecting formation disposed on the other of the wheel assembly or the actuator, the tapered projecting formation configured to engage in the tapered recess formation when the actuator is operated to load the strut.

15. A system as claimed in claim 14 in which the tapered recess formation is provided on the lower end of the wheel assembly, and the tapered projecting formation is provided on the actuator.

16. A system as claimed in claim 12 in which the load coupling comprises a coupling component connected to the lower end of the wheel assembly.

17. A system as claimed in claim 12 further comprising a first sensor for sensing a loading of the strut by the actuator, and in which a first control signal, generated by the first sensor, is used in a load feedback control loop to control operation of the actuator in loading the strut.

18. A system as claimed in claim 17 in which the first sensor is a position or load sensor.

19. A system as claimed in claim 12, further comprising a steering sensor for sensing steering of the wheel assembly by the actuator, and wherein a steering control signal, generated by the steering sensor, is used in a torque feedback control loop for controlling an operation of the actuator to steer the wheel assembly.

20. A system as claimed in claim 19 in which the steering sensor is a position or torque sensor.

21. A system as claimed in claim 12, further comprising a combined load and torque sensor connected between the actuator and the wheel assembly.

22. A system as claimed in claim 12 in which the actuator is controlled to simulate in use operating conditions of the wheel assembly in respect of strut loading.

23. An assembly testing apparatus, wherein an assembly under test includes a shock absorber strut, the testing apparatus comprising:
a combined linear and rotary actuator that includes a linear actuator configured to operate along a linear actuation axis aligned vertically with the strut, and a rotary actuator configured to apply a rotary steering torque to the strut about the linear actuation axis; and
a load coupling for engaging the combined actuator with the assembly under test, the load coupling including a first part disposed on the actuator, and a second part separate from the first part and attached to the assembly under test, the first and second parts configured to releasably interlock and self-align when the combined actuator engages the assembly in a linear mode.

24. The apparatus as claimed in claim 23 in which the load coupling is configured to transfer the steering torque load to the assembly when the actuator is operated in a rotary mode.

25. The apparatus as claimed in claim 23, wherein one of the first and second parts comprises a tapered recess formation and the other of the first and second parts comprises a tapered projecting formation, the tapered projecting formation for engaging the tapered recess formation.

26. The apparatus as claimed in claim 25 further comprising a sensor to produce a feedback signal for control of the actuator.

27. The apparatus as claimed in claim 26, wherein the sensor includes a load sensor.

28. The apparatus as claimed in claim 26, wherein the sensor includes a torque sensor.

29. The apparatus as claimed in claim 26, wherein the sensor includes a position sensor.

* * * * *